United States Patent [19]

Urabe et al.

[11] Patent Number: 4,639,722

[45] Date of Patent: Jan. 27, 1987

[54] LIQUID CRYSTAL DISPLAY APPARATUS

[75] Inventors: Tetsuo Urabe, Matsudo; Shigeru Kojima, Tokyo, both of Japan

[73] Assignee: Sony Corporation, Tokyo, Japan

[21] Appl. No.: 530,596

[22] PCT Filed: Nov. 19, 1982

[86] PCT No.: PCT/JP82/00442

§ 371 Date: Jul. 18, 1983

§ 102(e) Date: Jul. 18, 1983

[87] PCT Pub. No.: WO83/01841

PCT Pub. Date: May 26, 1983

[30] Foreign Application Priority Data

Nov. 20, 1981 [JP] Japan ............................. 56-186334

[51] Int. Cl.⁴ ............................................. G09G 3/36
[52] U.S. Cl. ..................................... 340/784; 340/713; 350/350 S; 350/351
[58] Field of Search ............... 340/713, 714, 765, 784; 350/351, 350 S, 349

[56] References Cited

U.S. PATENT DOCUMENTS

| | | | |
|---|---|---|---|
| 3,988,056 | 10/1976 | Harenz et al. | 350/351 |
| 4,031,529 | 6/1977 | Borel et al. | 340/713 |
| 4,150,396 | 4/1979 | Harenz et al. | 340/713 |
| 4,291,948 | 9/1981 | Crossland et al. | 350/349 |
| 4,367,924 | 1/1983 | Clark et al. | 350/350 S |
| 4,430,650 | 2/1984 | Billard et al. | 350/351 |
| 4,477,151 | 10/1984 | Mash | 350/351 |
| 4,479,118 | 10/1984 | Cole, Jr. | 340/784 |
| 4,499,458 | 2/1985 | Le Berro et al. | 340/713 |
| 4,514,045 | 4/1985 | Huffman et al. | 350/351 |
| 4,563,059 | 1/1986 | Clark et al. | 350/350 S |

*Primary Examiner*—Gerald L. Brigance
*Attorney, Agent, or Firm*—Hill, Van Santen, Steadman & Simpson

[57] ABSTRACT

This invention relates to a liquid crystal display apparatus and particularly to a liquid crystal display apparatus based on a liquid crystal light emitter actuated by the heat from a laser beam.

A liquid crystal display apparatus according to this invention is formed such that an energy beam is irradiated onto the arrays of smectic liquid crystal particles having polarities equivalent in energy directions and opposite to each other in dipole moments of the particles and applied with a voltage, which is too low to switch the arrays to each other to provide the display.

Consequently, according to the liquid crystal display apparatus of this invention, the writing speed of the display can be improved significantly and a high contrast of the display can be presented.

4 Claims, 8 Drawing Figures

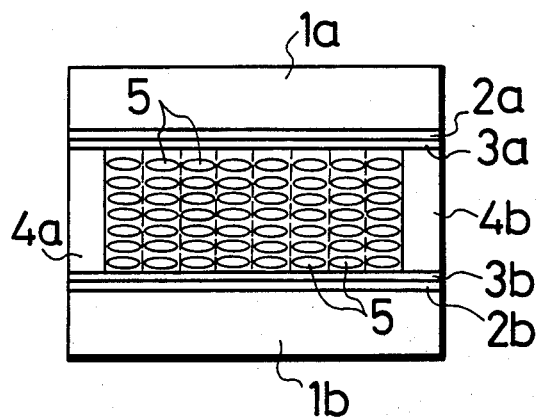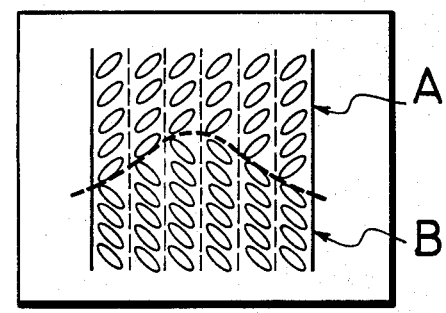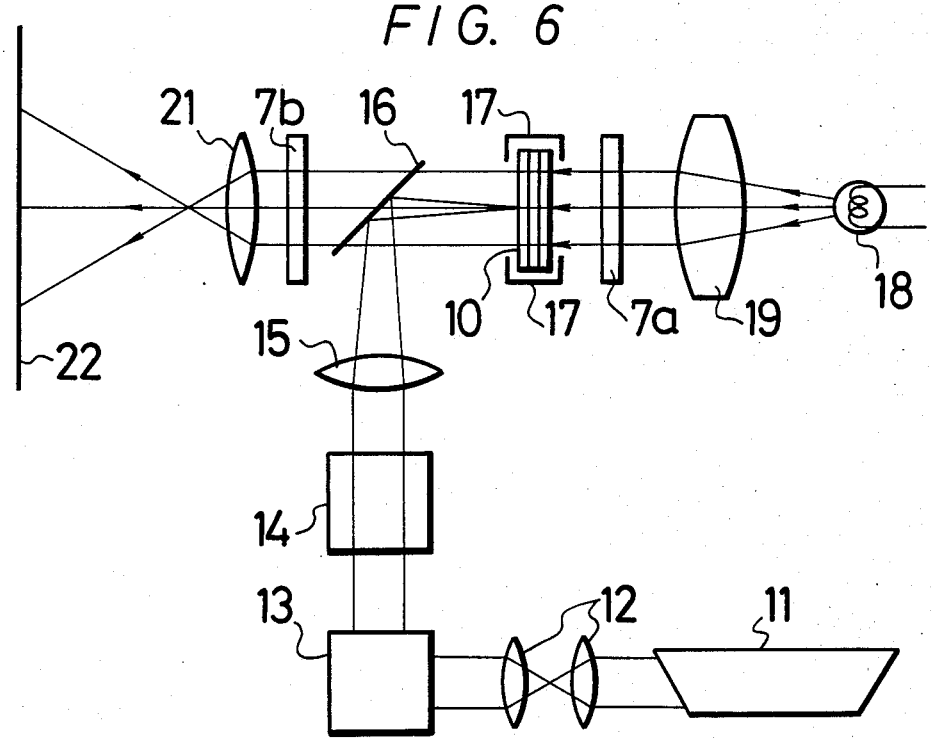

LIQUID CRYSTAL DISPLAY APPARATUS

DESCRIPTION

1. Technical Field

This invention relates to a liquid crystal display apparatus and more particularly is directed to a liquid crystal display apparatus based on a liquid crystal light emitter actuated by the heat from a laser beam.

2. Background Art

A conventional liquid crystal light emitter actuated by the heat from a laser beam is characterized in that its light scattering center is formed by a laser beam irradiation. The theory thereof will briefly be described with reference to a smectic liquid crystal. The smectic liquid crystal is changed in phase in the following order from a crystal phase, a smectic C phase, a smectic A phase, a nematic phase to an isotropic phase as the temperature thereof rises. Upon use or operation, the temperature of the liquid crystal is set at a temperature between a temperature $T_1$ at which the phase transition from the smectic C phase to the smectic A phase will occur and a temperature $T_2$ at which the phase transition from the smectic A phase to the nematic phase will occur, namely, the temperature at which the smectic A phase is retained. In the smectic A phase, the liquid crystal particles exhibit a layer-like structure and each layer is arrayed in the vertical direction. If the surface of a glass substrate is subjected to surface treatment in advance, the liquid crystal particles are arrayed in a layer vertical to the surface of the glass substrate. When a laser beam is focussed and then irradiated on the liquid crystal layer arranged as described above, the heat is generated in the portion thereof on which the laser beam is irradiated and the heat is conducted to the liquid crystal. Then, when the temperature of the liquid crystal exceeds the smectic A-nematic phase transition temperature $T_2$ and further exceeds the nematic-isotropic phase transition temperature $T_3$ the isotropic phase results. When the irradiation of the laser beam is stopped at that state, a tendency may appear such that the heated isotropic phase is cooled to restore the smectic A phase again. However, when it is quenched or cooled rapidly the liquid crystal is never returned to the first regular alignment state and the liquid crystal of the disordered orientation direction is kept as it is, thus that portion is recorded therein as a memory. If a voltage is applied to the liquid crystal cell on which the recording was performed as described above and the dielectric constant of the liquid crystal particle in the long axis direction thereof becomes larger than that in the short axis direction, the liquid crystal particles arrayed in the disordered state restore the regular alignment of layers again thereby erasing the recorded information. That is, if on the basis of such operation theory, the laser beam scans the liquid crystal and the intensity of the laser beam is modulated in synchronism therewith, the recording and the subsequent erasing of an image can be performed.

In this case, since the smectic-nematic phase transition or the nematic-isotropic phase transition is the primary phase transition, latent heat is required to cause the phase transition. Thus, the heat energy from the laser beam irradiated upon recording does not contribute to raise the temperature by a sufficient amount, which is then a great obstacle to the increase of the recording speed. Moreover, a sufficient scattering state is necessary to be generated for keeping the recorded display as the memory and for that purpose a quenching is required. Therefore, since the temperature rise upon heating by the laser beam must be as large as possible, it is quite disadvantageous that any loss occurs in the heat energy caused by the irradiation of the laser beam.

If the scattering state is used as the recording state a difficult problem of increasing the contrast is caused. That is, in order to solve the afore-mentioned problem, if the laser absorbing layer such as aluminium or the like is formed on the liquid crystal cell for the purpose of converting the light energy of the irradiated laser beam into heat energy as much as possible, the light absorbing efficiency is increased to thereby increase the recording efficiency and the display system becomes the reflection type, so that there is caused a defect in that a high contrast can not be presented as in the transparent type.

In order to make a display system of the liquid crystal cell into the transparent type, it should be possible to use a transparent conductive film made of indium oxide-tin oxide or the like as the laser absorbing layer or to mix coloring matter or dye into the liquid crystal, which can absorb the laser beam. Either of these methods has a limit in the absorption of the laser beam so that several difficult problems must be solved for the purpose of raising the temperature of the liquid crystal satisfactorily.

In view of such aspects, the present invention seeks to provide a liquid crystal display apparatus which can greatly overcome the various defects inherent in the conventional liquid crystal display apparatus and the liquid crystal display cell used therein can present quite high laser absorbing efficiency and contrast.

DISCLOSURE OF INVENTION

In a liquid crystal display apparatus according to this invention, the array of smectic liquid crystal particles arranged in such a state that they have a polarity equivalent in energy but opposite in dipole moment of the particles and have a voltage applied thereto, which is too low for switching, and is irradiated with a laser beam to provide the display.

According to this invention, a liquid crystal display apparatus can be provided which is capable of significant improvement of the recording speed and the high contrast of the display.

BRIEF DESCRIPTION OF DRAWINGS

FIG. 4 is a cross-sectional view showing an example of a liquid crystal display cell used in a liquid crystal display apparatus according to this invention, FIG. 5 is a plan view showing the array of the liquid crystal particles in FIG. 4, FIG. 6 is an example of a liquid crystal display apparatus according to this invention.

BEST MODE FOR CARRYING OUT THE INVENTION

Figure 1:
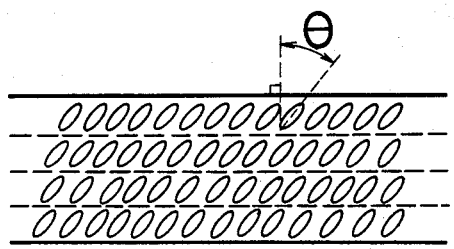
FIG. 1 is a cross-sectional view of a layer-like structure of a smectic C phase.
Figure 2:
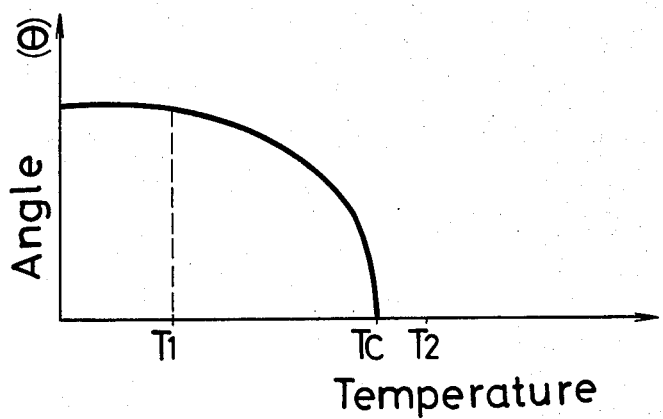
FIG. 2 is a graph showing the relation between a change of the phase transition of the smectic C phase and the temperature thereof.

An embodiment of the present invention will hereinafter be described in detail. A liquid crystal particle used in this invention is a smectic liquid crystal which is in the state called the smectic C phase. The smectic C phase has a layer structure common to the smectic phases. While the long axis of the particle in the smectic A phase is vertical to the layer direction thereof, the smectic C phase is characterized by the long axis of the particle being inclined by an angle $\theta$ from the normal to the layer as shown in FIG. 1. This angle $\theta$ is dependent on temperature. That is, as shown in FIG. 2, as the temperature of the smectic C phase rises, the angle $\theta$ thereof approaches zero and becomes zero at a center temperature Tc. In short, since this state is the smectic A phase, the temperature Tc is a phase transition temperature at which the smectic C phase changes to the smectic A phase.

Figure 3:
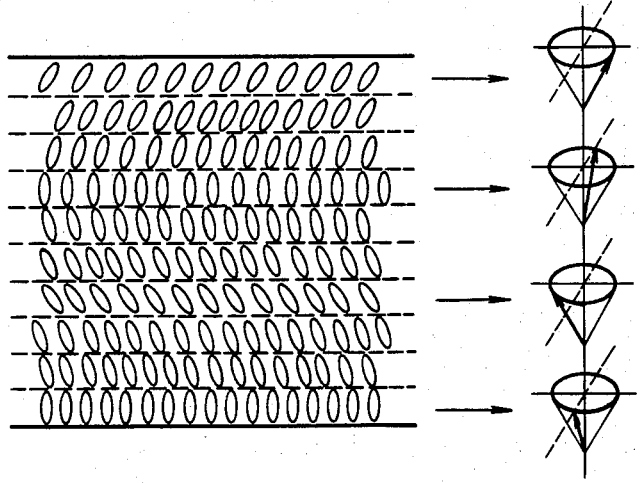
FIG. 3 is a cross-sectional view of a layer structure of a chiral smectic C phase (smectic C* phase) and an explanatory view illustrating the direction of dipole moments.

It is known that such smectic C phase is changed to a chiral smectic C phase (SmC*) by introducing an optical activity center thereto, which, in this state, demonstrates ferroelectricity. The structure of the chiral smectic C phase is characterized by a helical structure in which, as shown in FIG. 3, the long axis of each of the liquid crystal particles in the respective layers is inclined by a certain angle $\theta$ from the normal to the layers in the same way as in the respective layers of the smectic C phase and the liquid crystal particles in the adjacent layers are rotated about the normal as an axis. Thus, as shown in FIG. 3, the dipole moments of the particles are perpendicular to the plane formed by the long axis of each particle and the normal in the direction of the short axis of the particle. A liquid crystal having such chiral smectic C phase is, for example, p-decyloxy-benzylidene-p'-amino-2-methyl butyl cinnamate (DOBAMBC), p-hexyloxy-benzylidene-p'-amino-2 chloropropyl cinnamate (HOBACPC) and the like.

A liquid crystal display cell formed of the aforementioned liquid crystal, which can be applied to the liquid crystal apparatus according to this invention can be made as shown in FIG. 4. This liquid crystal display cell can be formed, for example, in such a manner that transparent electrodes 2a and 2b are respectively provided on the surfaces of glass substrates 1a and 1b, and horizontal orientation layers 3a and 3b obtained by spin coating of polyvinyl alcohol, for example, without rubbing are respectively provided on the transparent electrodes 2a and 2b. The horizontal orientation layers are disposed to face each other separated by a gap of approximately several micrometers, spacers 4a and 4b are disposed on the respective ends of the glass substrates to form a space, and a liquid crystal, for example, the above DOBAMBC is sealed into such space. Numeral 5 denotes liquid crystal layers.

The liquid crystal display cell formed as described above and being under such condition can not have the helical structure as shown in FIG. 3 but has the structure as shown in FIG. 4 even within the temperature range of the chiral smectic C phase (smectic C* phase). The reason for this may be that, since the cell is thin, a strong array restriction force on the glass surfaces acts strongly to prevent the liquid crystal particles from becoming the helical structure.

As shown in FIG. 5, the parallel alignment of the liquid crystal particles which may result on the glass surface may exist in two ways. As shown by A and B in FIG. 5, a two alignments A and B appear as domains which are equivalent in energy and the directions of the dipole moments of the particles are opposite to each other. Accordingly, if a DC voltage is applied thereto to change the polarity thereof, either of these two alignments can be selected and the bistable switching operation is possible.

In a liquid crystal display apparatus according to this invention which includes the liquid crystal display cell having the structure as described above structures, other than the liquid crystal display cell are the same as those of the conventional liquid crystal display apparatus. Thus, it can therefore be formed by a proper combination of conventional parts as the construction components.

Figure 7:
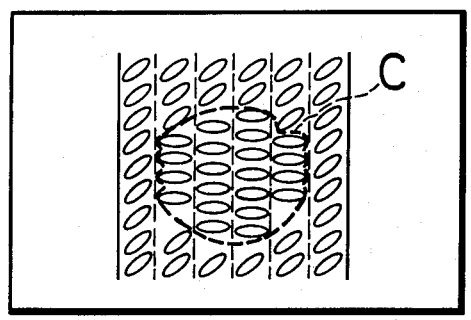
FIG. 7 is a plan view showing a portion of the array of the liquid crystal particles which is irradiated by a laser beam.
Figure 8:
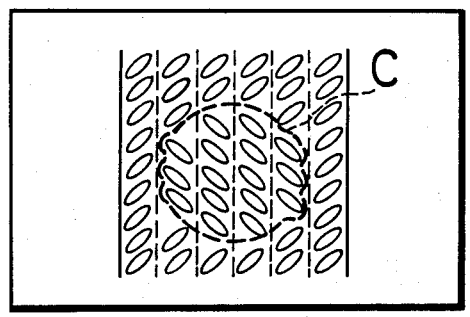
FIG. 8 is a plan view showing the array of the liquid crystal particles of the recorded display.

Now, with reference to FIG. 6 in which an example of the liquid crystal display apparatus is applied to a light emitter, the recording thereon will be explained. A laser beam such as GaAs laser beam emitted from a laser beam source 11 is introduced through a beam expander 12 to a modulator 13 and then focussed at a predetermined position on a liquid crystal display element 10 through an X-Y galvanomirror 14, a converging lens 15 and a half mirror 16. In this case, a part of the laser beam is absorbed by the transparent electrodes 2a and 2b of the liquid crystal display cell 10 and converted to heat, which is then conducted to the liquid crystal layer 5 to raise the temperature at that portion. That is, as shown in FIG. 2, the temperature of the liquid crystal layer is initially set by a heater 17 (shown in FIG. 6) at the temperature $T_1$ at which the liquid crystal particle exists in the chiral smectic C phase. Then, the portion of the liquid crystal layer 5 irradiated by the laser beam is heated to such a temperature at which the angle $\theta$ is reduced to zero, namely, the temperature $T_2$ which is higher than the chiral smectic C-smectic A phase transition temperature Tc. In this case, the temperature $T_1$ is preferably set at a temperature lower than the temperature Tc by about 2° to 10° C. As regards the state of the liquid crystal particles of that case, as shown in FIG. 7, the laser beam irradiated portion C is in the smectic A phase. Upon stopping of the irradiation of the laser beam, the portion the phase of which is transformed to the smectic A phase is cooled and returned to the smectic C* phase again. At this time, if a weak DC electric field is applied to the cell in its thickness direction, as shown in FIG. 5, the polarity thereof can selectively be determined as either of the arrays A or B. Namely, in the array A the dipole moment of the liquid crystal particle is in the upward direction, while in the array B the dipole moment of the liquid crystal particle is in the downward direction. And, the applied voltage in this case must be a feeble one which is too low for the switching of the array A⇌the array B at the temperature $T_1$. The array of the liquid crystal particles on which the recording was performed is shown in FIG. 8 within the area C.

As described above before in connection with FIG. 6, if the liquid crystal cell 10 is sandwiched by a polarizer 7a and an analyzer 7b, a contrast can be provided between the recorded portion and the portion not yet recorded. In this case, if the polarizer 7a is disposed in the long axis direction of the particle in the erased state and the analyzer 7b is disposed perpendicular thereto, the light, which is emitted from a light source 18, passed through a condenser 19 and the polarizer 7a and then made incident on the liquid crystal display cell 10, is passed through the liquid crystal display cell 10 with the linearly polarized light unchanged and interrupted by the analyzer 7b the display will be dark. On the other hand, since in the written portion, the long axis direction of the liquid crystal particle and the polarizing direction of the polarizer 7a are not coincident with each other, the light is affected by the double refraction in the liquid crystal cell 10. Thus, when coming out from the liquid crystal cell, it becomes an elliptically polarized light so that a part of the light is leaked through the analyzer 7b and projected through a lens 21 onto a display screen 22 to be readable.

As described above since the liquid crystal display apparatus according to this invention is unlike the conventional method employing as display a focal conic texture formed by using the phase transition such as smectic A-isotropic and colesteric-isotropic or the like and quenching thereof, and employs the smectic C*-smectic A phase transition, no latent heat is required and further the quenching in a wide range of temperature is not necessary so that such a significant rise of the temperature is not required to thereby achieve the large increase of the recording speed.

Furthermore, since the display method of the liquid crystal display apparatus of this invention is similar to that of a TN liquid crystal display cell, a high contrast can be obtained by a simple optical system. And furthermore the absorption of the laser beam can be carried out by mixing a coloring matter or dye, which has $\lambda_{max}$ in the vicinity of the laser oscillation wavelength, into the liquid crystal layer.

We claim:

1. A liquid crystal display apparatus comprising:
a pair of plates including internal opposing electrodes,
a smectic liquid crystal body confined between said plates and being bistably switchable in polarity between a first orientation state and a second orientation state in which molecules in said first and second orientation states have polarities equivalent in energy and have dipole moments in opposite directions,
means for initially orienting said molecules in said first state,
irradiating means for irradiating an energy beam onto said molecules so as to heat the same and change said molecules from said first orientation state into a third orientation state in which said molecules are substantially perpendicular to said plates, and
means for applying a weak DC electric field to said molecules to change said orientation state from said third state to said second state while the remainder of said molecules remain in said first state thereby providing information recording.

2. An apparatus according to claim 1 in which said means for initially orienting said molecules is a heating means.

3. An apparatus according to claim 1 wherein said irradiating means is a laser.

4. A method of providing a liquid crystal display which comprises:
providing a body of liquid crystal particles in the chiral smectic C phase,
irradiating said body with a modulated laser beam to selectively heat portions of said body above the chiral smectic C-smectic A phase transition temperature to thereby convert said portions to the smectic A phase, and
applying a weak DC electric field to said molecules to thereby change the orientation of the irradiated molecules into the chiral smectic C phase which is different in polarity from the remaining molecules, and thereby provide a display of the information contained in said modulated laser beam.

* * * * *